(12) United States Patent
O'Brien et al.

(10) Patent No.: US 9,017,781 B2
(45) Date of Patent: Apr. 28, 2015

(54) MATTING AND/OR FROSTING ADDITIVE FOR POLYMERS OR POLYMER BLENDS

(75) Inventors: Antony Bernard O'Brien, Richmond, IN (US); Kimberly Marie Chaplin, Richmond, IN (US); Emily Louise Fisher, Lynn, IN (US); Lora Sue Phillips, Greensfork, IN (US)

(73) Assignee: Holland Colours N.V., Apeldoorn (NL)

( * ) Notice: Subject to any disclaimer, the term of this patent is extended or adjusted under 35 U.S.C. 154(b) by 37 days.

(21) Appl. No.: 13/819,315

(22) PCT Filed: Sep. 2, 2011

(86) PCT No.: PCT/NL2011/050604
§ 371 (c)(1),
(2), (4) Date: Apr. 11, 2013

(87) PCT Pub. No.: WO2012/030224
PCT Pub. Date: Mar. 8, 2012

(65) Prior Publication Data
US 2013/0209710 A1 Aug. 15, 2013

Related U.S. Application Data

(60) Provisional application No. 61/379,426, filed on Sep. 2, 2010.

(51) Int. Cl.
*C08K 7/28* (2006.01)
*C08K 13/04* (2006.01)
*C08K 5/103* (2006.01)
*C08K 5/20* (2006.01)

(52) U.S. Cl.
CPC . *C08K 7/28* (2013.01); *C08K 5/103* (2013.01); *C08K 5/20* (2013.01)

(58) Field of Classification Search
CPC .................................. C08K 7/28; C08K 13/04
USPC .......... 428/34.4, 36.4, 402; 106/409; 523/219
See application file for complete search history.

(56) References Cited

U.S. PATENT DOCUMENTS

2007/0287014 A1 12/2007 Ozai et al.

FOREIGN PATENT DOCUMENTS

WO WO-98/56850 12/1998

*Primary Examiner* — Michael C Miggins
(74) *Attorney, Agent, or Firm* — Morrison & Foerster LLP

(57) ABSTRACT

The invention is directed to a matting and/or frosting additive concentrate for polymers or polymer blends, said additive comprising to 75% by weight of hollow glass microspheres and 20 to 95% by weight of a liquid or waxy carrier material and optionally up to 75% by weight of additives.

22 Claims, No Drawings

MATTING AND/OR FROSTING ADDITIVE FOR POLYMERS OR POLYMER BLENDS

CROSS-REFERENCE TO RELATED APPLICATIONS

This application is the national phase of PCT application PCT/NL2011/050604 having an international filing date of 2 Sep. 2011, which claims benefit of U.S. Ser. No. 61/379,426, filed 2 Sep. 2010. The contents of the above patent applications are incorporated by reference herein in their entirety.

The invention is directed to a matting and/or frosting additive concentrate for polymers or polymer blends.

In the plastics industry there is a need to provide certain visual properties to polymer products, such as a matte surface or a frosted look of a transparent, translucent or opaque article.

This article could be a pipe, box, bottle preform, bottle, fibre, film, sheet, or profile, but is not limited to these.

There is a need for an effective matting additive for polymers. Generally a matte surface is obtained by adding additives, such as titanium dioxide to the polymer, or by mechanical surface finish. These additives have the disadvantage of significantly impacting the color of the article. These additives must also be generally used at high levels to achieve the intended effect. The disadvantage to applying mechanical finishing is that it requires an additional step and equipment in the manufacturing process.

Likewise, there is a need for an effective frosting additive for polymers. It is known in the art to provide a frosting effect to polymers by incorporation of an additive into the polymer or to apply a coating on top thereof. Known additives are mica and silica. Disadvantage of these materials is that their surface effect is generally minimal and a relatively high surface gloss is maintained. This is undesirable in instances where the intention is to simulate the look of frosted glass. Use of these additives also affects the opacity of the final article. The disadvantage to applying a top coating is that it requires an additional step and equipment in the manufacturing process.

In WO 98/56950 the use of light scattering particles in a thermoplastic polymer to impart a frosting effect has been described. The description includes numerous types of particles, which may be added to the polymer as such or as a concentrate. As a carrier material, polymeric and non polymeric carrier materials have been mentioned.

In US-A 2007/287014 a liquid organopolysiloxane composition for matting a product comprises (A) a thermosetting liquid organopolysiloxane composition, and (B) a hollow filler. This composition is applied as a coating on the surface of a product, which is then cured.

The present invention is based on the discovery that hollow glass microspheres (HGM), or glass bubbles, have the surprising property of providing a matting and/or a frosting effect, when incorporated into a polymer or polymer blend in the form of a concentrate in a liquid or waxy carrier material, for producing a transparent, translucent or opaque article. In addition the HGM may also provide a matting effect to the surface of certain articles, when included in the polymer or polymer blend. An example thereof is a PVC profile for window frames and the like.

In a first embodiment the invention is accordingly directed to a matting and/or frosting additive concentrate for polymers or polymer blends, said additive comprising 5 to 75% by weight of hollow glass microspheres and 20 to 95%, preferably 20 to 75% by weight of a liquid or waxy carrier material and optionally up to 75% by weight of additives.

The concentrate is introduced into the polymer or polymer blend at some stage during the processing thereof. It is preferred to introduce the concentrate during the melt processing of the polymeric material, for example in the extruder or injection molder. In order to reduce breakage of the spheres, the concentrate is preferably added at a relatively late stage. The amount of concentrate to be used is dependent on the level of HGM and other additives needed in the final product.

In a second embodiment the invention is directed to the use of the concentrate for providing a matting and/or frosting effect in polymers or polymer blends.

In a third embodiment the invention is directed to the use of hollow glass microspheres to provide a matting and/or frosting effect to polymers or polymer blends and in a fourth embodiment to the articles prepared from the said polymer or polymer blend.

The concentrate is intended to be incorporated in the polymer or polymer blend, and is not used as a coating on the surface of an article.

One component of the concentrate according to the first embodiment is the carrier material. The carrier material can be in the form of a liquid, a wax or a wax/polymer blend. The amount of carrier material ranges from 20 to 95 wt. % of the concentrate, preferably from 20 to 75 wt. %.

In case of the use of a liquid (at ambient temperatures, 20° C.) carrier material in general natural or synthetic materials which are liquid at ambient temperatures, may be used. More in particular, it is possible to use liquid fatty acid esters or synthetic oils.

The carrier material to be used in the invention is generally an inert material, which means that it will not undergo a curing or other reaction, during processing into the polymer or polymer blend to provide the frosting effect thereof. Reactive carrier materials such as a thermosetting liquid organopolysiloxane composition are not suitable for use in the present invention. Accordingly, these materials are not included herein.

It is preferred to use C6 to C18 fatty acid esters of trimethylolpropane (2-ethyl-2-(hydroxymethyl)-1,3 propanediol).

The esters are preferably tri-esters. The fatty acid component may be linear or branched and is selected from the C6 to C18 fatty acid moieties. Preferred are heptanoate, caprate, caprylate; laurate, isostearate and/or oleate. Most preferred are trimethylolpropane tri-esters, such as laurate, caprate and caprylate, optionally in combination of two or more thereof. In this respect it is to be noted that the fatty acids are natural products, which has the consequence, as is well known, that they consist of a mixture of various chain lengths, with the emphasis on the indicated value, i.e. a C8 fatty acid will accordingly also contain, apart from the majority of C8, also amounts of C6 and C10, or even some C4 or C12. It is thus to be understood that the chain length indicated for the fatty acid moiety is to be understood in the accepted sense in the art, namely that of a mixture of chain lengths distributed around the indicated value, with the chain length indicated being present as the largest fraction.

In case of the use of a waxy carrier material, the waxy material is preferably selected from natural, synthetic and modified natural waxes. A practicable definition for waxes was developed by the M-Wax Department of the German Society for Fat Science (Deutsche Gesellschaft für Fettwissenschaft or DGF for short), first published in 1957 and revised in 1974: "Wax is a technical collective designation for a series of natural or artificially produced materials that have the following characteristics:

kneadable at 20° C.,
firm to brittle hard,
coarsely to finely crystalline,
translucent to opaque, but not glassy,
melts above 40° C., without breaking down,
relatively low viscosity already just above the melting point, consistency and solubility heavily dependent on temperature,
polishable under light pressure."

In general, waxes are classified as follows:
Natural waxes: Animal, vegetable, and mineral in origin.
Artificial waxes:
Chemically modified waxes/semi-synthetic waxes, where an existing wax molecule is chemically modified, more specifically modified oils, such as hydrogenated oils.
Synthetic waxes: A wax is built up on a low-molecular, non-waxy molecule or by decomposition of a macromolecular plastic.

According to a preferred embodiment the waxy material has been selected from the group of synthetic and artificial waxes, more in particular selected from the group of polyethylene wax, oxidized polyethylene wax, amide wax, ester wax, hydrogenated oil and combinations thereof.

The wax may also be blended with a polymer, provided the resulting material keeps its waxy properties. The polymer used in the wax/polymer blend will vary depending on the polymer it's incorporated into. It is not necessarily the same polymer.

In addition to the HGM and the carrier material, the concentrate may further contain other additives to be incorporated into the polymer or polymer blend. However, it is also possible to introduce these other additives separately from the HGM.

Examples of these additives are reinforcing agents, UV absorbers, AA scavengers, oxygen scavengers, antislip agents, antistatic agents, flame retardants, heat stabilizers, colorants and the like. A lower limit of the amount of these additives, if present, may be 0.001 wt. %.

The amount of HGM in the concentrate can vary within a broad range, depending on the intended use. As indicated, the amount ranges between 5 and 75% by weight. It is preferred to use 40 to 60% by weight.

Hollow glass microspheres (HGM) are commercially available materials, for example from 3M™. These materials are gas filled hollow glass bubbles, preferably soda-lime-borosilicate glass spheres, and are usually applied for reducing the weight of polymeric materials, such as core materials for honeycomb products. The particle size of the HGM to be applied in the present invention generally ranges from 10 to 50 micron.

Other additives may be present in the concentrate in amounts of up to 75% by weight.

In a preferred embodiment the concentrate consists of 40 to 60 wt. % of HGM, up to 20 wt. % of additives and 40 to 60 wt. % of carrier material.

As the matting and/or frosting effect is already achieved at low loadings of the hollow glass microspheres in the polymer, the amount of concentrate to be added to the polymer may be as low as, for example, 0.0001 parts per hundred, and as high as 10 parts per hundred (by weight) depending on the level of other additives in the concentrate as required for the final article. In a preferred embodiment this range is 0.0005 and 7.5 parts per hundred by weight of polymer or polymer blend.

The concentrate can be prepared by mixing (milling) of the components in suitable equipment, such as a mixing tank equipped with a suitable dissolver blade. The mixing step can be followed by further processing into solid particles, such as pellets.

It has been found essential to use a liquid, waxy or wax/polymer blend carrier material in combination with a gentle mixing process in order not to crush the HGM and thus provide the full effect of matting and/or frosting.

The temperature at which the concentrate can be processed is relatively flexible. There is generally no need to deviate from the normal processing temperature of the polymer that is used.

The concentrate can be used to add HGM to polymers for all kinds of applications, such as injection molding of PET preforms, but not limited to this. Also the use in polyester sheet, fibers, and the like is possible. More in general, the concentrate may be used in combination with polymers, such as polyesters, like PET, PEN, PBT and polylactide, or with ethylene polymers, propylene polymers, vinyl chloride polymers, polycarbonate, styrene polymers, elastomers and blends thereof.

An important use is in PET bottles, where the concentrate produces a dull, frosted effect, with gloss reduction levels of up to 60%. In addition the bottles have a soft touch feel.

The invention is now elucidated on the basis of some, non-limiting examples.

EXAMPLE 1

A concentrate based on 50 wt. % HGM in 12-hydroxy-N-(2-hydroxyethyl)-octadecanamide was incorporated into a white PVC extrusion profile compound at 2 pph. A control with no hollow glass microspheres was also produced. A comparison of the surface gloss for each sample was made using a gloss meter set at an angle of 60°. The comparison showed a 25% reduction in gloss.

EXAMPLE 2

The same concentrate used in Example 1 was used to produce bottles in PET. Concentrations varied from 0.10 to 0.75 pph. The resulting bottles showed a dull frosted appearance similar to frosted glass. Using a gloss meter with the angle set at 60°, a reduction in gloss of 16 to 63% was obtained when compared to the control PET sample, without the concentrate.

The invention claimed is:

1. A matting and/or frosting additive concentrate for polymers or polymer blends, said additive comprising 5 to 75% by weight of hollow glass microspheres and 20 to 95% by weight of a carrier that consists of an inert liquid or of waxy material wherein the waxy material is a hydrogenated oil, an ester wax, a polyethylene wax or an oxidized polyethylene wax or combinations thereof.

2. The concentrate of claim 1, wherein the said microspheres have a particle size between 10 and 50 μm.

3. The concentrate of claim 1, wherein the carrier is a waxy material selected from the group consisting of a polyethylene wax, an oxidized polyethylene wax and a combination thereof.

4. The concentrate of claim 1, wherein the hollow glass microspheres are gas filled soda-lime-borosilicate glass spheres.

5. The concentrate of claim 1, which further comprises at least one additive selected from the group consisting of colorants, reinforcing agents, UV absorbers, AA scavengers, oxygen scavengers, antislip agents, antistatic agents, flame retardants, and heat stabilizers.

6. The concentrate of claim 1, wherein the carrier is an inert liquid which is a fatty acid ester.

7. The concentrate of claim 6, wherein the inert liquid carrier is a fatty acid ester of trimethylolpropane.

8. A method to provide matting and/or frosting effect in polymers or polymer blends which comprises adding to the polymers or blends the concentrate of claim 1.

9. The method of claim 8, wherein the polymer or polymer blend is selected from the group consisting of polyesters, propylene polymers, ethylene polymers, styrene polymers, polycarbonate, vinyl chloride polymers and blends thereof.

10. The method of claim 9, wherein the polyester is polyethylene terephthalate.

11. The method of claim 8, wherein the amount of hollow glass microspheres in the polymer or polymer blend is between 0.0001 and 10 parts per hundred, by weight of polymer or polymer blend.

12. The method of claim 11 wherein the amount of hollow glass microspheres in the polymer or polymer blend is between 0.0005 and 7.5 parts per hundred by weight of polymer or polymer blend.

13. The method of claim 8, wherein the carrier is an inert liquid which is a fatty acid ester.

14. The method of claim 13, wherein the inert liquid carrier is a fatty acid ester of trimethylolpropane.

15. An article prepared from a polymer or polymer blend, which polymer or blend comprises the concentrate of claim 1.

16. The article of claim 15 which is a bottle.

17. The article of claim 15, wherein the carrier is an inert liquid which is a fatty acid ester.

18. The article of claim 17, wherein the inert liquid carrier is a fatty acid ester of trimethylolpropane.

19. A polymer or polymer blend which comprises the concentrate of claim 1.

20. The polymer or polymer blend of claim 19, wherein the carrier is an inert liquid which is a fatty acid ester.

21. The polymer or polymer blend of claim 20, wherein the inert liquid carrier is a fatty acid ester of trimethylolpropane.

22. The polymer or polymer blend of claim 19, wherein the amount of hollow glass microspheres in the polymer or polymer blend is between 0.0001 and 10 parts per hundred, by weight of polymer or polymer blend.

* * * * *